US011472571B2

(12) United States Patent
Dondoneau et al.

(10) Patent No.: US 11,472,571 B2
(45) Date of Patent: Oct. 18, 2022

(54) AVIATION INTEGRATED OPTICS AND LIGHTING UNIT

(71) Applicant: Appareo Systems, LLC, Fargo, ND (US)

(72) Inventors: Matt Dondoneau, West Fargo, ND (US); Kristofer Garberg, Fargo, ND (US); Nicholas Butts, West Fargo, ND (US)

(73) Assignee: Appareo Systems, LLC, Fargo, ND (US)

( * ) Notice: Subject to any disclaimer, the term of this patent is extended or adjusted under 35 U.S.C. 154(b) by 0 days.

(21) Appl. No.: 17/145,148

(22) Filed: Jan. 8, 2021

(65) Prior Publication Data

US 2021/0214099 A1 Jul. 15, 2021

Related U.S. Application Data

(60) Provisional application No. 62/958,795, filed on Jan. 9, 2020.

(51) Int. Cl.
*B64D 47/00* (2006.01)
*B64D 47/08* (2006.01)
*H04N 5/232* (2006.01)
*B64D 47/02* (2006.01)
*B60Q 1/00* (2006.01)

(52) U.S. Cl.
CPC .......... *B64D 47/08* (2013.01); *B60Q 1/0023* (2013.01); *B64D 47/02* (2013.01); *H04N 5/23203* (2013.01)

(58) Field of Classification Search
CPC .... B64D 47/08; B64D 47/02; H04N 5/23203; B60Q 1/0023
See application file for complete search history.

(56) References Cited

U.S. PATENT DOCUMENTS

| | | | | |
|---|---|---|---|---|
| 7,982,662 | B2* | 7/2011 | Shaffer | G01S 7/4813 |
| | | | | 250/203.1 |
| 8,089,617 | B2* | 1/2012 | Fluckiger | G01S 17/08 |
| | | | | 356/3.01 |
| 9,635,739 | B2* | 4/2017 | Schoen | B64D 47/06 |
| 10,670,249 | B1* | 6/2020 | Brahmbhatt | F21S 41/663 |
| 11,222,204 | B2* | 1/2022 | Wagner | G01S 17/89 |
| 2016/0107767 | A1* | 4/2016 | Jha | F21S 8/003 |
| | | | | 362/470 |
| 2018/0173245 | A1* | 6/2018 | Twining | B64D 45/00 |
| 2019/0055017 | A1* | 2/2019 | Oba | B64C 39/024 |
| 2019/0137628 | A1* | 5/2019 | Lukoschat | B64D 47/08 |

* cited by examiner

*Primary Examiner* — Gerald J Sufleta, II
(74) *Attorney, Agent, or Firm* — Hovey Williams LLP

(57) ABSTRACT

An aviation integrated optics and lighting unit for securing to a light receptacle of an aircraft. The aviation integrated optics and lighting unit comprises a housing, a light-emitting device, and an optical sensor. The light-emitting device is secured to the housing. The optical sensor is positioned in the housing and is configured to capture optical data.

6 Claims, 7 Drawing Sheets

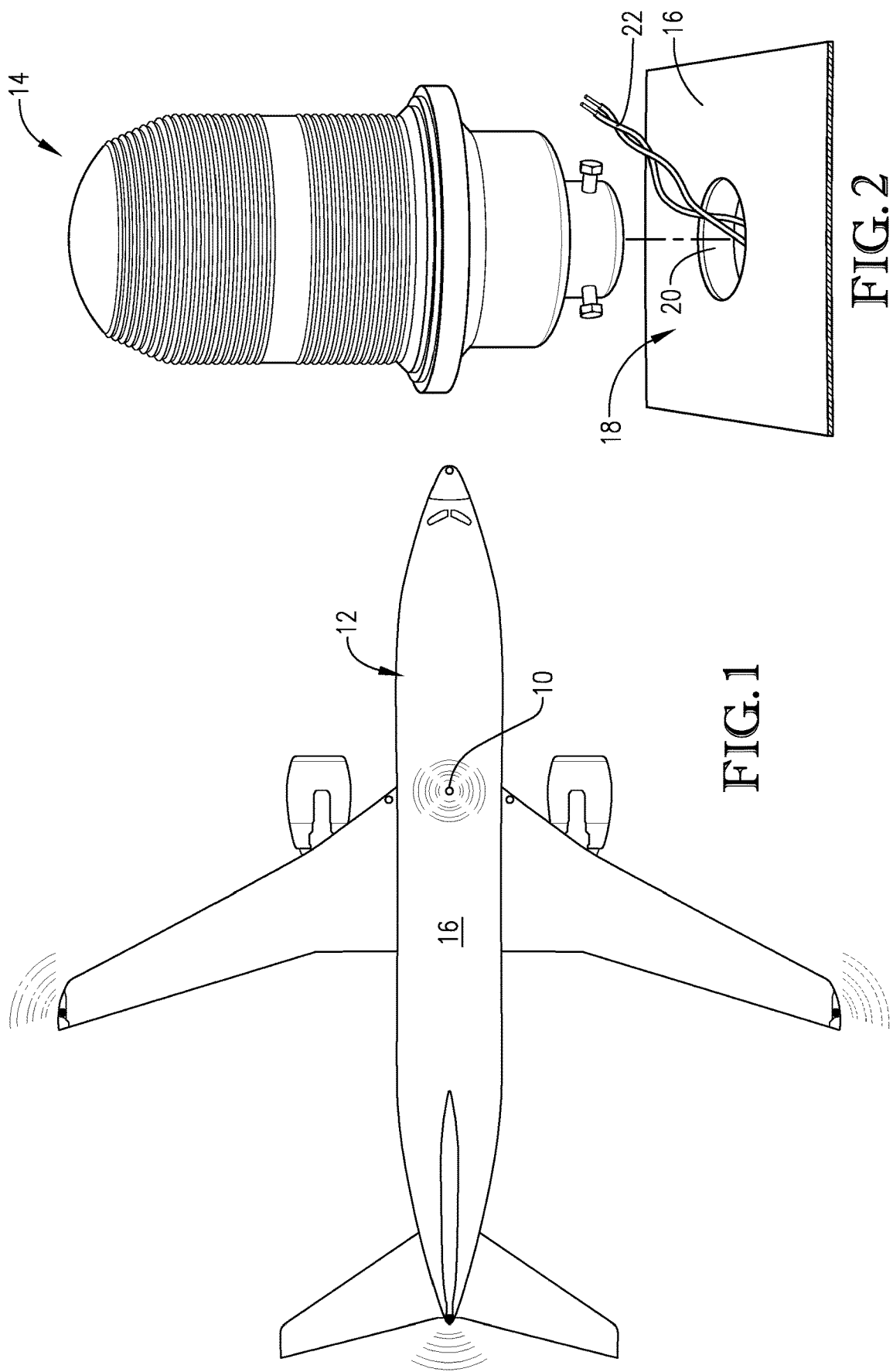

AVIATION INTEGRATED OPTICS AND LIGHTING UNIT

CROSS-REFERENCE TO RELATED APPLICATIONS

This non-provisional patent application claims priority benefit, with regard to all common subject matter, of commonly assigned U.S. provisional patent application Ser. No. 62/958,795, filed Jan. 9, 2020, and entitled "AVIATION INTEGRATED OPTICS AND LIGHTING UNIT" ("the '795 application"). The '795 application is hereby incorporated by reference in its entirety into the present non-provisional patent application.

BACKGROUND

Pilots and passengers often capture in-flight images and videos via cameras operated within the aircraft. However, such images and video are often obstructed by glare or moisture on the windows and provide limited views of the aircraft's surroundings. To capture images outside of the aircraft, current solutions may involve mounting a camera to exterior portions of an aircraft. However, mounts used to hold the cameras must be certified by the Federal Aviation Administration (FAA). Additionally, current solutions use wireless cameras, which rely on batteries that often die prematurely.

This background discussion is intended to provide information related to the present invention which is not necessarily prior art.

BRIEF SUMMARY

The present invention solves the above-described problems and other problems by providing an aviation integrated optics and lighting unit that is FAA compliant, robust, and readily installable.

An aviation integrated optics and lighting unit according to an embodiment of the present invention comprises a housing, a light-emitting device, and an optical sensor. The light-emitting device is secured to the housing. The optical sensor is positioned in the housing and is configured to capture optical data. The optical sensors enables an unobstructed view of the aircraft's surrounding and the housing can be used to replace an existing beacon light or the like.

Another embodiment is a method of installing an aviation integrated optics and lighting unit. The method comprises removing a lighting unit from an exterior surface of an aircraft; and providing the aviation integrated optics and lighting unit. The aviation integrated optics and lighting unit comprises a housing, a light-emitting device, a power port, an optical sensor, and a controller. The housing includes a bottom side, a sidewall with a through hole, and a translucent portion. The light-emitting device is positioned in the translucent portion. The optical sensor is positioned in the housing and at least partially extends into the through hole. The optical sensor is configured to capture optical data. The controller is in communication with the light-emitting device and the optical sensor. The controller is configured to receive a signal representative of an instruction to capture optical data; and receive a signal representative of captured optical data from the optical sensor. The method further comprises connecting the power port of the aviation integrated optics and lighting unit to a power cable of the aircraft; and attaching the bottom side of the housing of the aviation integrated optics and lighting unit to the exterior surface of the aircraft.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

FIG. 1 is a perspective view of an aviation integrated optics and lighting unit constructed according to an embodiment of the invention installed on an exemplary aircraft;

FIG. 2 is a side perspective view of an existing light being removed from the aircraft of FIG. 1;

Figure 4:
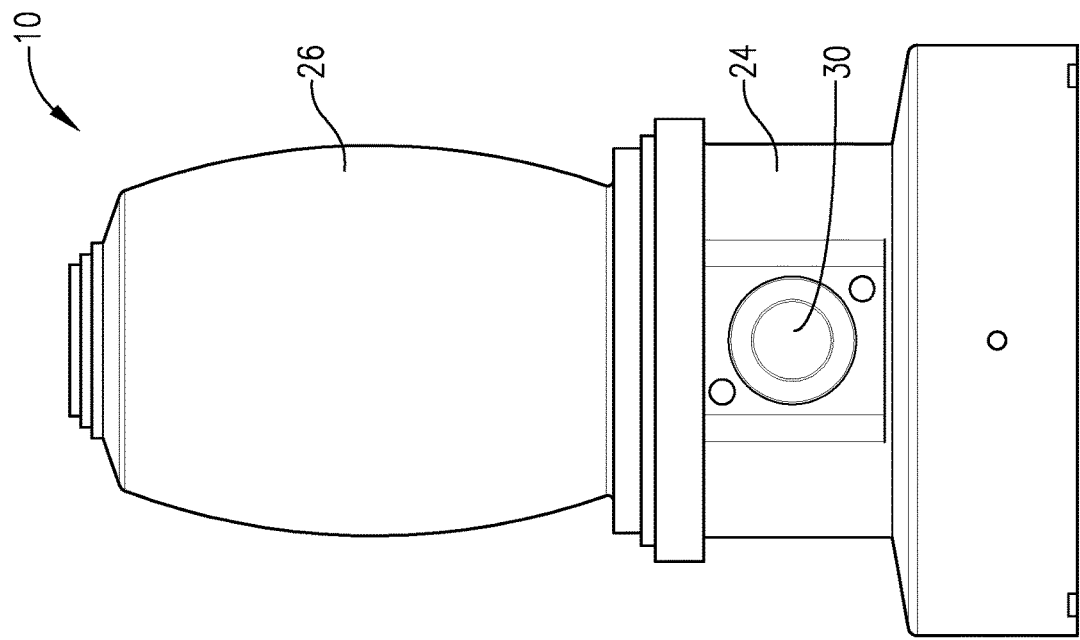
FIG. 4 is a side perspective view of the aviation integrated optics and lighting unit of FIG. 1.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, an aviation integrated optics and lighting unit 10 constructed in accordance with an embodiment of the invention is illustrated implemented on an exemplary aircraft 12. The aviation integrated optics and lighting unit 10 is configured to replace an existing light 14, such as a beacon light system, a position light system, an anti-collision light system, a landing light system, a logo light, an ice light, or the like, on an aircraft 12. The aircraft 12 may be an airplane, jet plane, helicopter, or the like. The aircraft 12 may include an exterior portion 16 having a light receptacle 18 to which the existing lighting system 14 was secured, as depicted in FIG. 2. The light receptacle 18 may comprise one or more holes 20 for fastening the lighting system 14 to the aircraft 12 and/or for connecting the lighting system 14 to an existing power cable 22 of the aircraft 12. In some embodiments, the power type associated with the cable 22 may include a 12-volt system, a 24-volt system, or a 14-to-28-volt nominal system. In some embodiments, the nominal voltage range standard used may be 9-32 volts.

Figure 3:
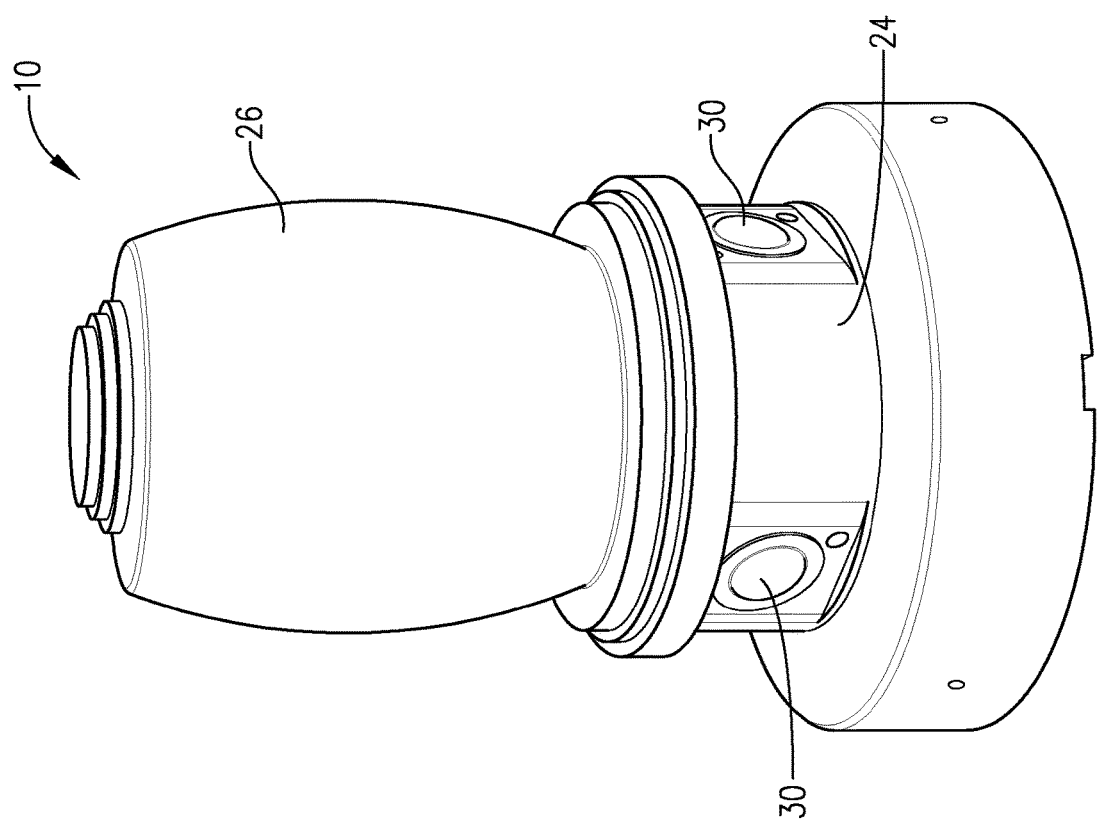
FIG. 3 is an elevated perspective view of the aviation integrated optics and lighting unit of FIG. 1.
Figure 5:
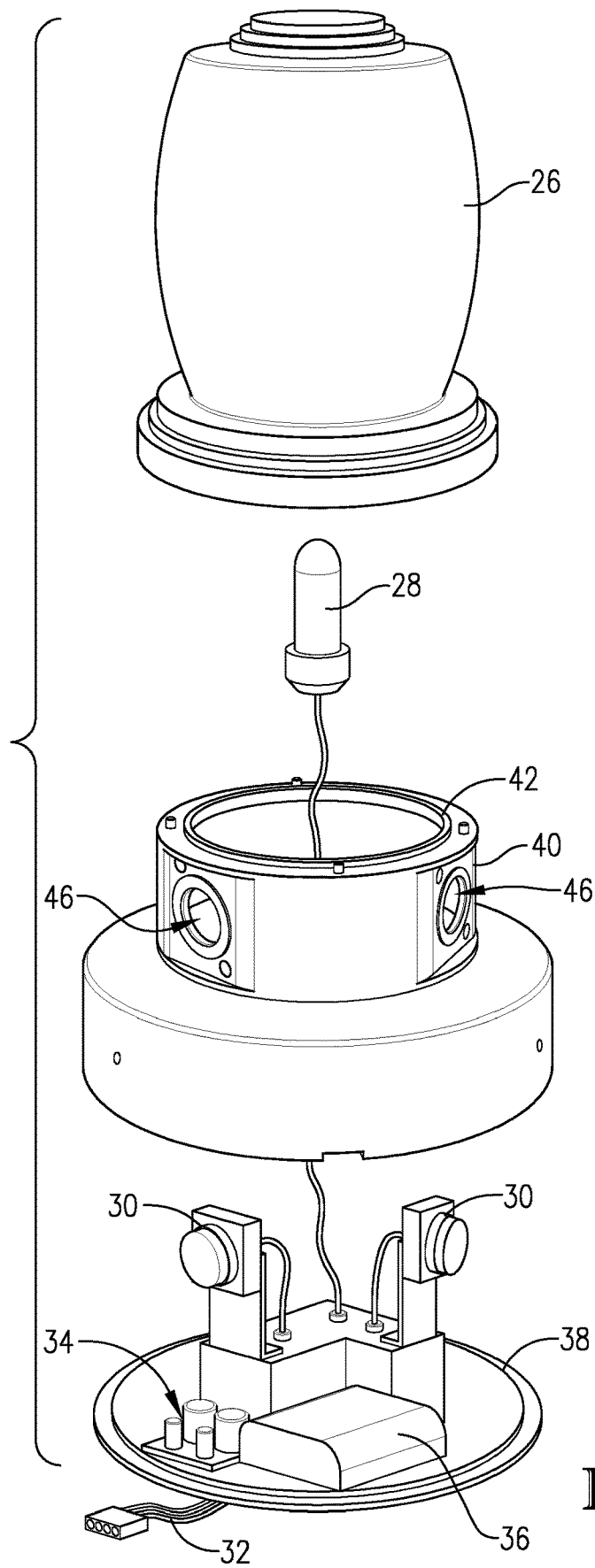
FIG. 5 is an exploded view of the aviation integrated optics and lighting unit of FIG. 1.

Turning to FIGS. 3-5, the aviation integrated optics and lighting unit 10 comprises a camera housing 24, a light housing 26, a light-emitting device 28, one or more optical units 30, a power port 32, a rechargeable power source 34, and a controller 36. The camera housing 24 may comprise a bottom side 38, a sidewall 40, and a top side 42. The bottom side 38 may be configured to be attached to the exterior portion 16 of the aircraft 12, such as the light receptacle 18. The bottom side 38 may include a through hole through which the power cable 22 and/or the power port 32 may extend for connecting the unit 10 to existing aircraft power systems. The sidewall 40 extends generally upward from the bottom side 38 and includes one or more camera through holes 46 for receiving a portion of the one or more optical units 30. The top side 42 may include a light through hole 48 through which the light-emitting device 28 may at least partially extend. In some embodiments, the camera housing 24 comprises a machined aluminum enclosure.

The light housing 26 may be translucent and house a portion of the light-emitting device 28. The light housing 26 may be configured to be secured to the top side 42 of the camera housing 24. The light-emitting device 28 is configured to emit light, such as flashing lights or the like. The light-emitting device 28 may comprise an LED light or the like. The light-emitting device 28 may be powered by circuitry of the aircraft 12 or may comprise its own internal circuitry.

The optical units 30 are housed in the camera housing 24 and are configured to capture optical data. The optical units 30 may at least partially extend into the camera through holes 46 of the side wall 40 of the camera housing 24. The optical units 30 may comprise digital cameras, multispectral imaging sensors, hyperspectral imaging sensor, such as sensors for detecting and/or capturing light on the visual spectrum, ultraviolet spectrum, near infrared light, mid-infrared light, far-infrared light, or thermal infrared light, or the like. In some embodiments, the optical units 30 comprise one or more single wide field-of-view lenses. In some embodiments, two or more of the optical units 30 may be positioned about the camera housing 24 so that they can provide a 360-degree view about the unit 10. The optical units 30 may comprise different types of optical sensors or imaging devices.

The power port 32 generally provides power from the cable 22 of the aircraft to components of the unit 10. The power port 32 may comprise a harness, connector, or the like, and may be configured to connect to the cable 22. The rechargeable power source 34 is connected to the power port 32 and may provide power to components of the unit 10 when, for example, the aircraft 12 is turned off so that no power is supplied through the cable 22 of the aircraft 12. The rechargeable power source 34 may comprise one or more capacitors, capacitor banks, batteries, battery banks, inductors, inductor banks, power/battery management systems, or the like. The rechargeable power source 34 may be housed in the camera housing 24. In some embodiments, when the aircraft 12 is powered, the rechargeable power source 34 may be configured to trickle charge by pulling a limited amount of current from the power cable 22.

Figure 6:
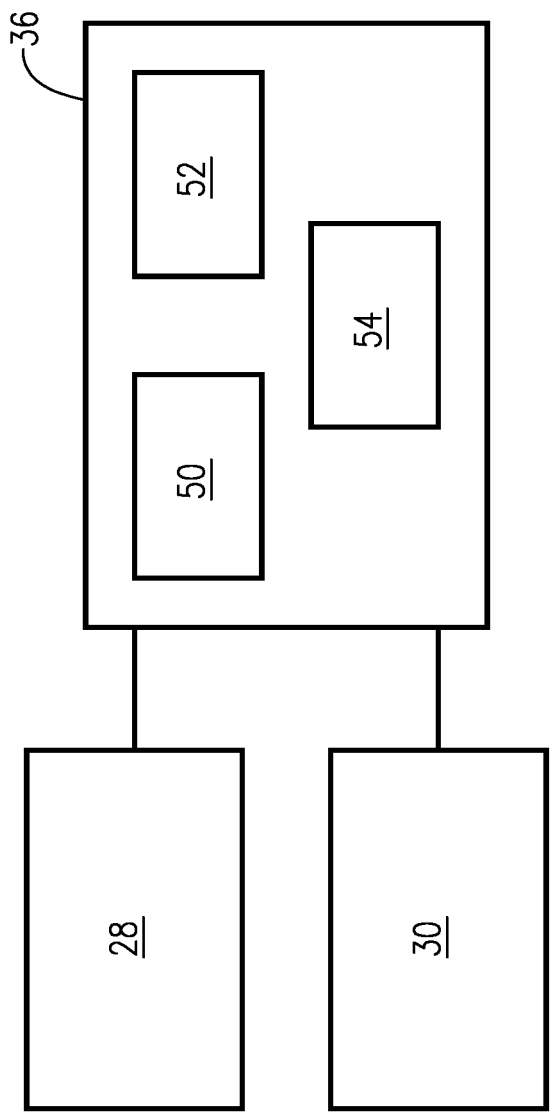
FIG. 6 is a schematic view depicting select components of the aviation integrated optics and lighting unit of FIG. 1.

Turning to FIG. 6, the controller 36 may be in communication with the light-emitting device 28 and the optical units 30 and may comprise a processing element 50, a memory element 52, and a communication element 54. In some embodiments, the controller 36 and the optical units 30 are integrated into a single device. The processing element 50 may include electronic hardware components such as processors. The processing element 50 may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 50 may generally execute, process, or run instructions, code, code segments, software, firmware, programs, applications, apps, processes, services, daemons, or the like. The processing element 50 may also include hardware components such as an inertial measurement unit (IMU), or other motion detection devices, finite-state machines, sequential and combinational logic, and other electronic circuits that can perform the functions necessary for the operation of the current invention. The processing element 50 may be in communication with the other electronic components through serial or parallel links that include universal busses, address busses, data busses, control lines, and the like.

The memory element 52 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof.

In some embodiments, the memory element 52 may be embedded in, or packaged in the same package as, the processing element 50. The memory element 52 may include, or may constitute, a "computer-readable medium." The memory element 52 may store the instructions, code, code segments, software, firmware, programs, applications, apps, services, daemons, or the like that are executed by the processing element 50. The memory element 52 may also store settings, data, documents, sound files, photographs, movies, images, databases, and the like.

Figure 7:
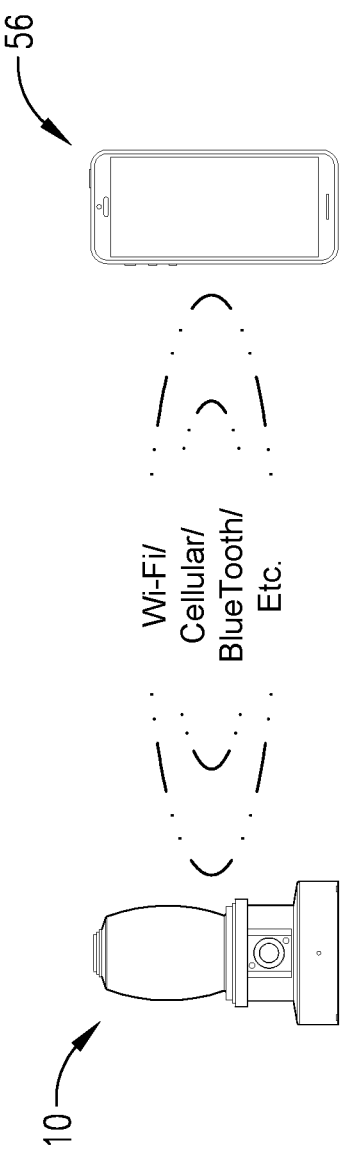
FIG. 7 is a schematic view of the aviation integrated optics and lighting unit of FIG. 1.

The communication element 54 generally allows communication between the unit 10 and external devices 56, as in FIG. 7. The communication element 54 may include signal or data transmitting and receiving circuits, such as antennas, amplifiers, filters, mixers, oscillators, digital signal processors (DSPs), and the like. The communication element 54 may establish communication wirelessly by utilizing radio frequency (RF) signals and/or data that comply with communication standards such as cellular 2G, 3G, 4G or 5G, Institute of Electrical and Electronics Engineers (IEEE) 802.11 standard such as Wi-Fi, IEEE 802.16 standard such as WiMAX, Bluetooth™, or combinations thereof. In addition, the communication element 54 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 54 may establish communication through connectors or couplers that receive metal conductor wires or cables, like Cat 6 or coax cable, which are compatible with networking technologies such as ethernet. In certain embodiments, the communication element 54 may also couple with optical fiber cables. The communication element 54 may respectively be in communication with the processing element 50 and/or the memory element 52.

The controller 36 is configured to receive optical data from the optical units 30. The controller 36 is also configured to receive, via the communications element 54, instructions from to the external device 56. The controller 36 may be configured to control operations of the optical units 30 via the processing element 50. The controller 36 may be configured to store the optical data and/or other data on the memory element 52 via the processing element 50. The controller 36 may also be configured to transmit the captured optical data to the external device 56. In some embodiments, the controller 36 is configured to stitch optical data comprising, for example, images taken from the optical units 30 to create one image or video. In some embodiments, the controller 36 is configured to detect intensity changes of the flashing on the light-emitting device 28 and compensate for light flashing in creating an image or video.

In some embodiments, the controller 36 is configured to provide security measures. For example, the controller 36 may be configured to detect, via the processing element 50, motion based on an IMU or other motion detection devices or the optical data, such as optical data representative of movement of the aircraft 12 and/or movement of objects about the aircraft 12. The controller 36 may be configured to wirelessly transmit, via the communication element 54, a notification to the external device 56 if the aircraft 12 moves or if there is motion detected around the aircraft 12. Additionally, the controller 36 may be configured to activate one of the optical units 30 comprising a camera and capture optical data comprising a recording or live video of what is occurring on or around the aircraft 12. The controller 36 may be configured to transmit signals representative of the recording or live video to the external device 56. In some embodiments, the controller 36 may be configured to perform object recognition based on optical data. In some embodiments, the controller 36 may be configured to perform image-stacking techniques to enhance low light performance of the optical units 30 comprising a camera and capture images in near total darkness.

In some embodiment, the controller 36 may be connected to a gateway module's discrete I/O of the aircraft 12 and be configured to power a relay to activate the light-emitting device 28. Embodiments of the present invention can be used standalone or with the gateway module. The gateway module described herein may comprise the gateway module disclosed in U.S. Provisional Patent Application 62/941,443, entitled "AVIATION CONNECTIVITY GATEWAY MODULE SYSTEM FOR REMOTE DATA OFFLOAD", which is hereby incorporated by reference in its entirety. The controller 36 may also be configured to independently activate the light-emitting device 28, in order to, for example, have an initial set of optical data representative of an initial picture at power-on.

In some embodiments, the external device 56 comprises a mobile device, laptop, computing device, an access point (such as a Wi-Fi connection, FBO access point, Stratus portable receiver used as a Wi-Fi router), and/or the like. Alternatively or additionally, the controller 36 may be configured to connect to a service platform of a gateway module. By using the gateway module as an access point, embodiments of the present invention enable use of the gateway module's cellular, Wi-Fi, or other radio to transmit requests and/or messages via a cellular and/or cloud network 60 remotely anywhere in the world through an application. In some embodiments, the controller 36 may be configured to communicate, via the communication element 54, with only external devices 56 having a proprietary application loaded thereon and receiving instructions therefrom. In some embodiments, the controller 36 may be configured to only receive, via the communication element 54, instructions from an external device 56 connected to the same network (such as a Wi-Fi network or other wireless/RF network), as depicted in FIG. 7.

Figure 8:
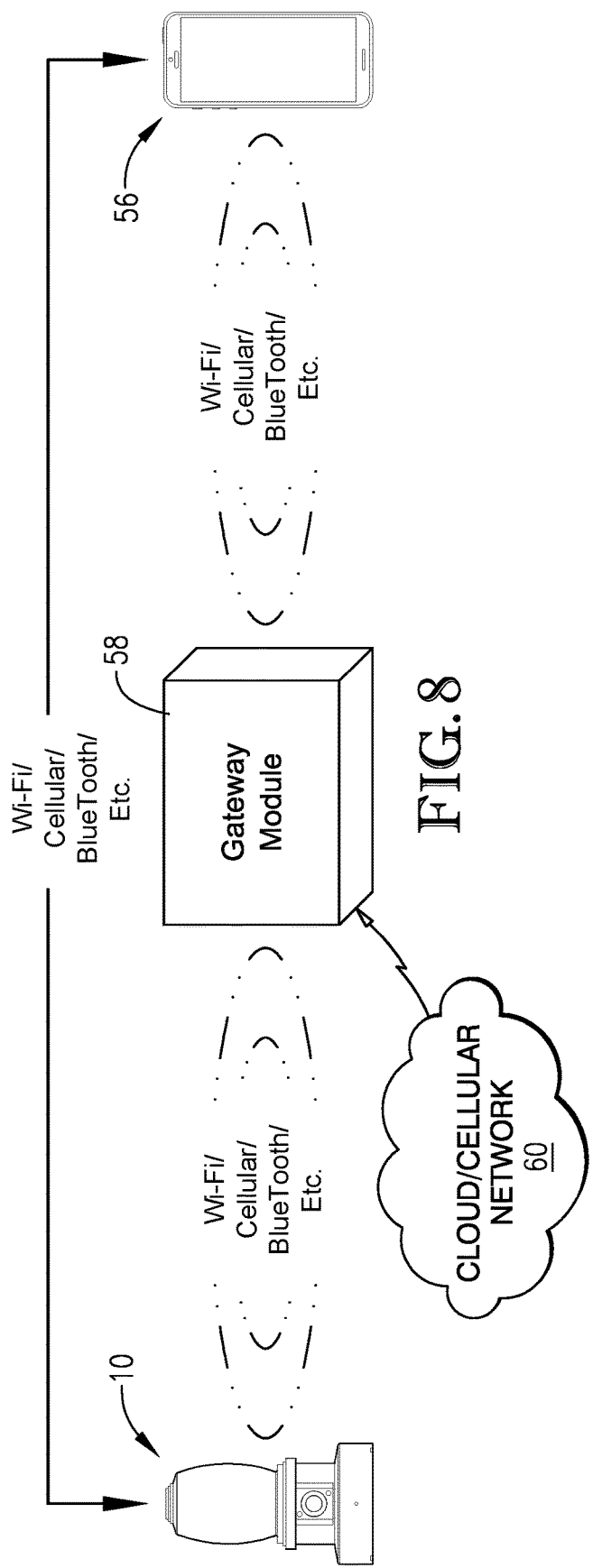
FIG. 8 is a schematic view of an exemplary communications architecture implementing the aviation integrated optics and lighting unit of FIG. 1 and a gateway module.
Figure 9:
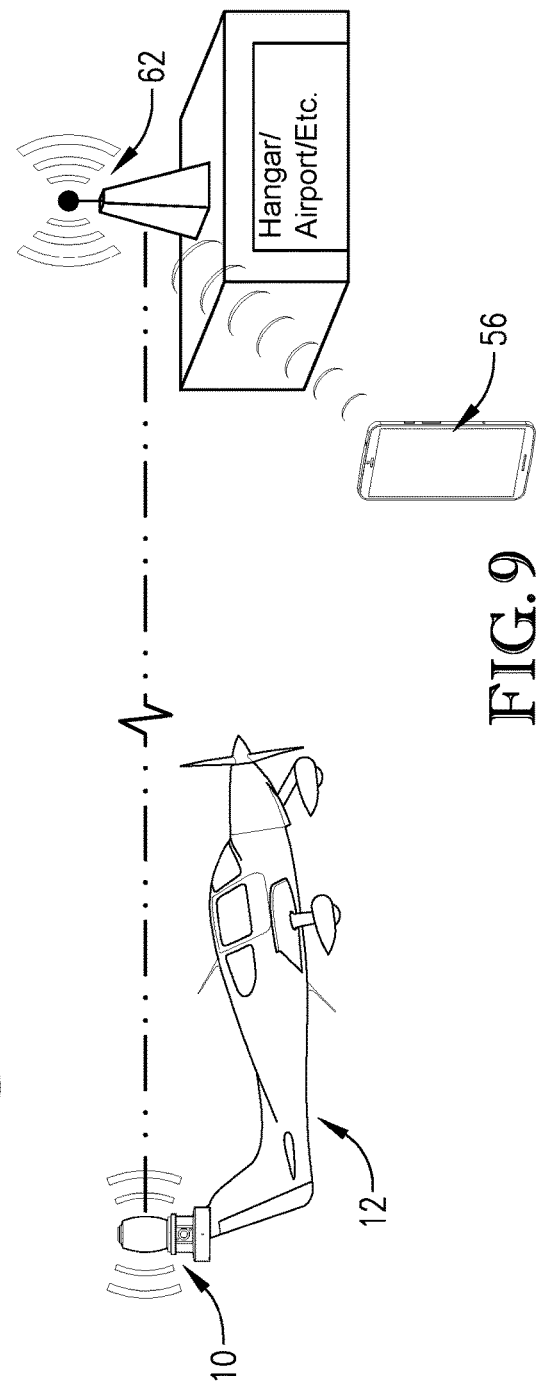
FIG. 9 is a schematic view of an exemplary communications architecture implementing the aviation integrated optics and lighting unit of FIG. 1 and a wireless access point.

In some embodiments, the controller 36 may be configured to communicate, via the communication element 54, through a gateway module 58 and/or the external device 56 having a user interface, as depicted in FIG. 8. For example, the gateway module 58 may relay communications between the external device 56 and the communication element 54 of the unit 10. The communication element 54 may be configured to also communicate directly with the external device 56 via wireless communication. The connection to the gateway module 58 allows for wireless data upload through a communication network 60, such as via a cellular network, the cloud, and/or a Wi-Fi network. The gateway module 58 allows for the unit 10 to be awakened and to send information (video and/or images) globally via wireless communication, such as via the cellular network 60.

In some embodiments, a wireless access point 62, such as a wireless network at a hangar or airport, may relay communications between the communication element 54 of the unit 10 and the external device 56. This enables worldwide connection capability to the unit 10. This also enables the optical lighting unit 10 to be used as an access point with associated wireless networks (such as Wi-Fi). In such embodiments, for a user to receive pictures or video remotely while not in the same vicinity as the wireless network, the system may require the user to be connected to a general wireless network (such as Wi-Fi), wireless access point, fixed base operator, or to the gateway module 58 in order to upload via wireless communication, such as cellular. The controller 36 may be configured to require particular credentials to connect to the wireless access point 62.

Figure 10:
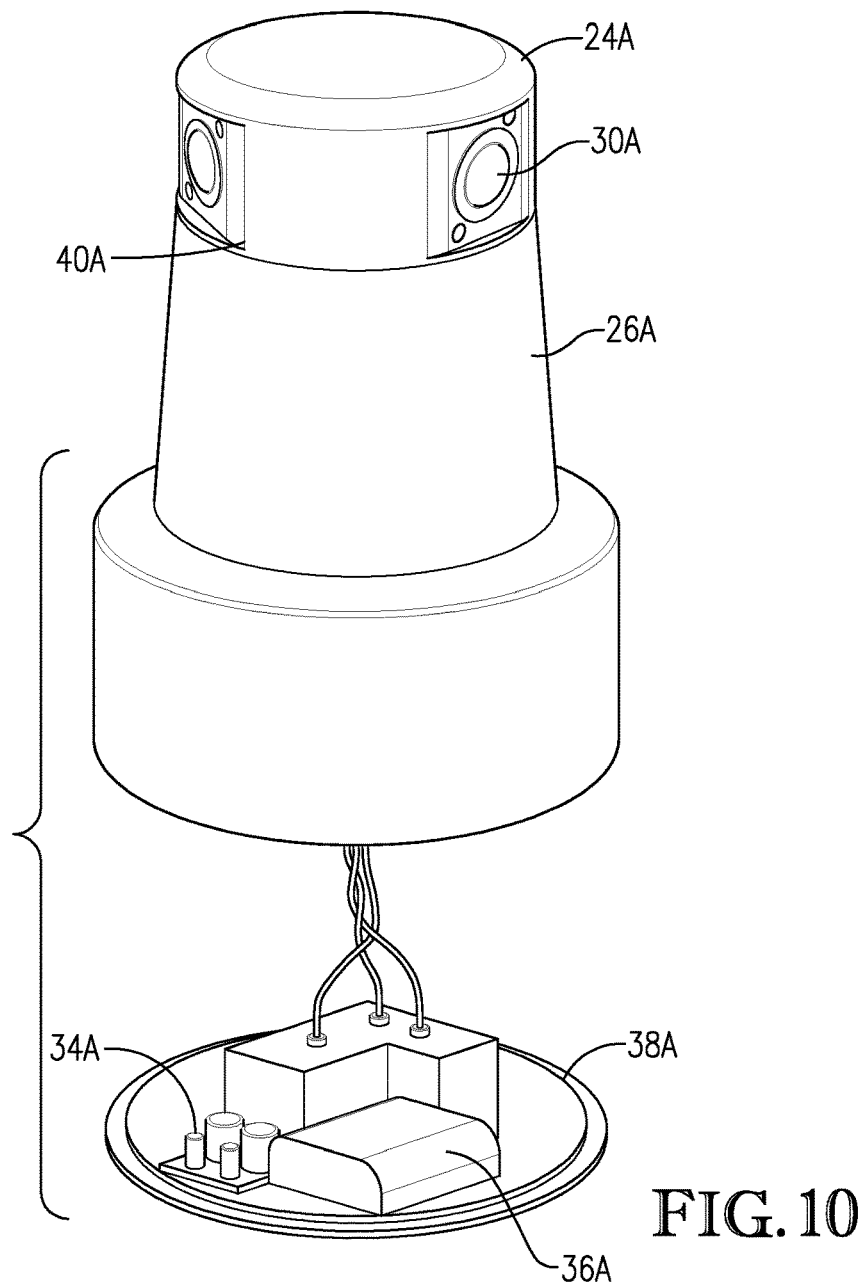
FIG. 10 is a perspective view of an aviation integrated optics and lighting unit constructed according to another embodiment of the invention.

An aviation integrated optics and lighting unit 10A constructed in accordance with another embodiment of the invention is shown in FIG. 10. The aviation integrated optics and lighting unit 10A may comprise substantially similar components as aviation integrated optics and lighting unit 10; thus, the components of aviation integrated optics and lighting unit 10A that correspond to similar components in aviation integrated optics and lighting unit 10 have an 'A' appended to their reference numerals.

The aviation integrated optics and lighting unit 10A includes all the features of aviation integrated optics and lighting unit 10 except that the camera housing 24A is positioned on top of the light housing 26A.

Figure 11:
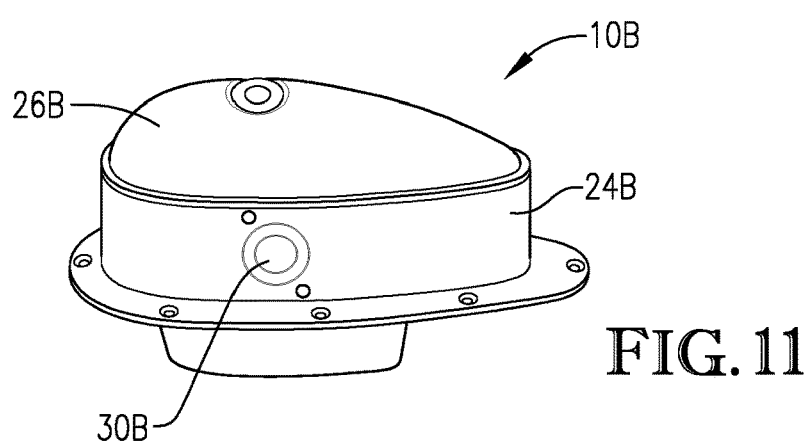
FIG. 11 is a perspective view of an aviation integrated optics and lighting unit constructed according to another embodiment of the invention.

An aviation integrated optics and lighting unit 10B constructed in accordance with another embodiment of the invention is shown in FIG. 11. The aviation integrated optics and lighting unit 10B may comprise substantially similar components as aviation integrated optics and lighting unit 10; thus, the components of aviation integrated optics and lighting unit 10B that correspond to similar components in aviation integrated optics and lighting unit 10 have a 'B' appended to their reference numerals.

The aviation integrated optics and lighting unit 10B includes all the features of aviation integrated optics and lighting unit 10 except that the camera housing 24B and the light housing 26B are elongated in an aerodynamic shape.

Figure 12:
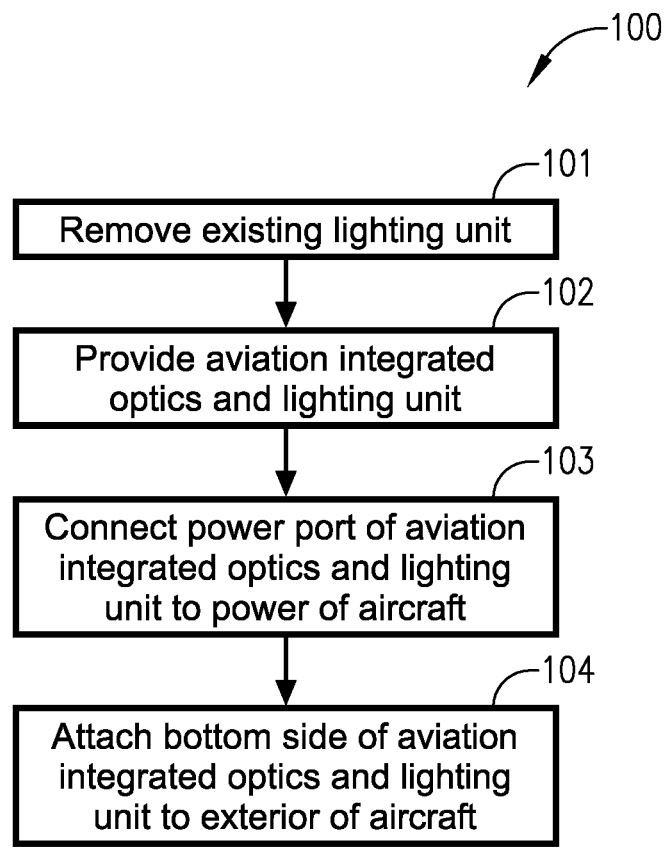
FIG. 12 is a flowchart illustrating at least a portion of the steps for installing an aviation integrated optics and lighting unit according to an embodiment of the present invention.

FIG. 12 depicts a flowchart including a listing of steps of an exemplary method 100 for installing an aviation integrated optics and lighting unit according to an embodiment of the present invention. The steps may be performed in the order shown in FIG. 12, or they may be performed in a different order. Furthermore, some steps may be performed concurrently as opposed to sequentially. In addition, some steps may be optional.

The method 100 is described below, for ease of reference, as being executed by exemplary devices and components introduced with the embodiments illustrated in FIGS. 1-13. However, a person having ordinary skill will appreciate that responsibility for all or some of such actions may be distributed differently among such devices or other computing devices without departing from the spirit of the present invention.

Referring to step 101, an existing lighting unit is removed from an exterior surface of an aircraft. The lighting unit may comprise a beacon light system, a position light system, an anti-collision light system, a landing light system, a logo light, an ice light, or the like. The aircraft may be an airplane, jet plane, helicopter, or the like. The exterior surface may include a light receptacle to which the existing lighting system was secured. The light receptacle may comprise one or more holes for fastening the lighting system to the aircraft and/or for connecting the lighting system to an existing power cable and/or communication system of the aircraft. In some embodiments, the power type associated with the cable may include a 12-volt system, a 24-volt system, or a 14-to-28-volt nominal system. In some embodiments, the nominal voltage range standard used may be 9-32 volts. This step may include disconnecting the existing lighting unit from the cable.

Referring to step 102, an aviation integrated optics and lighting unit constructed according to an embodiment of the present invention may be provided. The unity may comprise a housing, a light-emitting device, a power port, an optical sensor, and a controller. The housing includes a bottom side, a sidewall with a through hole, and a translucent portion. The light-emitting device is positioned in the translucent portion. The optical sensor is positioned in the housing and at least partially extends into the through hole. The optical sensor is configured to capture optical data. The controller is in communication with the light-emitting device and the optical sensor and is configured to receive a signal representative of an instruction to capture optical data; and receive a signal representative of captured optical data from the optical sensor.

Referring to step 103, the power port of the aviation integrated optics and lighting unit is connected to the power cable of the aircraft. This step may comprise connecting two wires, splicing wires, installing a harness on the power cable and connecting it to a connector of the power port, or the like. This step may also comprise connecting a communication line, cable, or bus to the controller of the aviation integrated optics and lighting unit.

Referring to step 104, the bottom side of the housing of the aviation integrated optics and lighting unit is attached to the exterior surface of the aircraft. This make comprise using one or more fasteners extending through the bottom side and holes of the exterior portion of the aircraft to secure the bottom side of the housing to the aircraft. This step may also comprise applying sealants, adhesives, or the like to the aviation integrated optics and lighting unit and/or the aircraft.

The method may include additional, less, or alternate steps and/or device(s), including those discussed elsewhere herein. For example, the method may include wirelessly connecting a communication element of the controller of the aviation integrated optics and lighting unit to an external device.

Additional Considerations

In this description, references to "an embodiment", "an embodiment", or "embodiments" mean that the feature or features being referred to are included in at least an embodiment of the technology. Separate references to "an embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in an embodiment may also be included in other embodiments, but is not necessarily included. Thus, the current technology can include a variety of combinations and/or integrations of the embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as transceiver elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of installing an aviation integrated optics and lighting unit, the method comprising:
   removing a lighting unit from an exterior surface of an aircraft;
   providing the aviation integrated optics and lighting unit, wherein the aviation integrated optics and lighting unit comprises—
     a housing including—
       a bottom side,
       a sidewall with a through hole, and a translucent portion;
a light-emitting device positioned in the translucent portion;
a power port;
an optical sensor positioned in the housing and at least partially extending into the through hole, the optical sensor configured to capture optical data; and
a controller in communication with the light-emitting device and the optical sensor, the controller being configured to—
receive a signal representative of an instruction to capture optical data; and
receive a signal representative of captured optical data from the optical sensor;
connecting the power port of the aviation integrated optics and lighting unit to an existing power cable of the aircraft; and
attaching the bottom side of the housing of the aviation integrated optics and lighting unit to the exterior surface of the aircraft.

2. The method of claim 1, further comprising connecting an external device to the aviation integrated optics and lighting unit so that the external device is in wireless communication with the aviation integrated optics and lighting unit.

3. An aviation integrated optics and lighting unit for securing to an exterior portion of an aircraft and connecting to an existing power cable of the aircraft, the aviation integrated optics and lighting unit comprising:
a camera housing including—
a top side with a light through hole,
a bottom side attachable to the exterior of the aircraft, and
a sidewall with a camera through hole;
a light housing attached to the top side of the camera housing;
a light-emitting device positioned in the light housing and extending at least partially through the light through hole;
a camera positioned in the camera housing and at least partially extending into the camera through hole;
a power port configured to connect to the power cable of the aircraft;
a controller in communication with the light-emitting device and the camera, the controller being configured to—
receive a wireless signal representative of an instruction to activate the camera from an external device;
activate the camera;
receive a signal representative of a captured image from the camera; and
transmit a wireless signal representative of the captured image to the external device.

4. The aviation integrated optics and lighting unit of claim 3, further comprising a power source connected to the power port and configured to receive power therefrom.

5. The aviation integrated optics and lighting unit of claim 3, wherein the controller is configured to detect motion based on at least one of the captured image or signals representative of IMU-detected motion, and transmit a wireless signal representative of an indication of motion to the external device.

6. The aviation integrated optics and lighting unit of claim 3, wherein the camera is a first camera, the camera through hole is a first camera through hole, and the camera housing includes a second camera through hole, further comprising a second camera in communication with the controller.

* * * * *